Patented June 16, 1953

2,642,389

UNITED STATES PATENT OFFICE 2,642,389

TREATING METHOD FOR HIGH-BOILING ESTERS

Charles A. Cohen, Roselle Park, and Fred Knoth, Jr., Sayreville, N. J., assignors to Standard Oil Development Company, a corporation of Delaware No Drawing. Application December 30, 1950, Serial No. 203,796

5 Claims. (Cl. 202—56)

This invention relates to the production of organic esters, and more particularly, to the quality improvement of impure higher boiling esters, particularly those produced by means of the Oxo reaction. The process is adapted for the removal of acidic catalytic materials, unreacted starting materials, and diluents from the esters, such impurities resulting from the original esterification.

The treating process is specifically concerned with the production and purification of esters of $C_8$ Oxo alcohol to obtain odorless, colorless, thermally stable, esters which may be used as synthetic oils and as plasticizers, for instance, for clear vinyl resins. The types of esters which may be treated by this include organic esters of dicarboxylic acids with both mono and polyhydric alcohols such as phthalate esters. Mono basic esters can also be treated by this process. The treatment is most applicable to organic esters boiling above 150° C.

In general, two methods of esterification are employed. In one, known as the high temperature process, the acid or acid anhydride such as phthalic anhydride, is mixed with an excess of alcohol and heated to speed the reaction and to remove the water of esterification. The heating is continued until esterification is substantially completed. The total reaction mixture is either topped or stripped to remove the lower boiling constituents and the finished ester may be used as such or may be distilled preferably under vacuum. The ester product made by this process is usually dark in color, and since, it has been subjected to high thermal conditions, it suffers from various degrees of degradation. Also, if the alcohol contains more than traces of organically combined sulfur, the resulting ester is usually contaminated and has a bad odor.

A second method of esterification involves the use of only a slight excess of alcohol but produces the esterification in the presence of an acid catalyst and usually by the addition of a third component in order to act as an entrainer or as an azeotrope former for the removal of water at a lower temperature. Suitable acid catalysts which may be used are sulfuric acid, the aromatic sulfonic acid such as benzene sulfonic acid, toluene sulfonic acid, naphthalene sulfonic acid, etc. Suitable entrainers or azeotrope formers are the low boiling aromatics such as benzene, toluene, xylene and the like, paraffinic hydrocarbons of suitable boiling point such as commercial heptane, n- and iso-octane or suitable olefinic materials such as diisobutylene, a copolymer of isobutylene and n-butylene known commercially as codimer, etc. Although the acid catalyzed process more nearly approaches the quantitative esterification of the acid or anhydride used, it introduces the problem of removing the acid catalyst without either causing some hydrolysis of the ester or suffering loss of product in the emulsions which are invariably formed when the crude ester is washed with aqueous systems in order to displace the acid.

The invention consists of quantitatively removing the acidic catalysts as well as other impurities from such esters by contacting or percolating the crude ester at the completion of esterification and prior to distillation with or through Attapulgus clay.

For the purposes of contacting, it is possible to use an Attapulgus clay or fuller's earth which has been activated at a temperature within the limits of 350°–550° F. for a period of from ½ to 4 hours. The preferred activating conditions are about ½ hour of heating at 450° F. The degree and time of heating should reduce the water content to from 6 to 10%, preferably to a value of 8%. The water content of the clay can be determined satisfactorily by burning a sample at 1200° F. for one hour and measuring its loss in weight.

The contacting material should have a particle size of greater than 20 mesh and less than 100 mesh with a maximum of 325. Where the clay is to be used for percolation purposes, it is preferred that the material have a particle size such that it will pass through a 30 mesh screen and be retained on a 60 mesh screen.

For most purposes, the clays which are desirable are naturally occurring and are slightly basic in chemical action.

In the acid-catalyzed esterification reaction, a substantial amount of the low-boiling aromatic hydrocarbon which is commonly employed as a water entrainer to remove water which is split off by the esterification as fast as it is formed, remains with the residual esterification product. In some instances, it has been found to be helpful to have present a rather large excess of this aromatic hydrocarbon in order to protect the ester product against decomposition and overheating during the final stages of the reaction. The residual ester product may thus be admixed with the remaining excess aromatic hydrocarbon, any excess of alcohol used in the esterification, the non-volatile acidic catalyst such as sulfuric acid, and any by-products of the reaction between the sulfuric acid catalyst and aromatic hydrocarbon as, for instance, aromatic sulfonic acids.

The contaminated ester mixture without preliminary distillation, water washing or any other treatment which might result in undesirable effects on the water, is then treated with the adsorptive clay.

The clay is specific with respect to the adsorption of at least two types of undesirable impurities which are associated with the crude ester. These include the acid catalyst itself, although it should be realized that in most cases where free sulfuric acid is used as the esterification catalyst in the presence of an aromatic hydrocarbon water entrainer, the major part of the sulfuric acid is present in the final mixture in the form of an aromatic sulfonic acid. For this reason, no substantial difference in final product contaminants can be detected between whether an aromatic sulfonic acid or free sulfuric acid is initially used as the acid esterification catalyst. Thus, the clay adsorption method for purification of the ester offers the additional advantage of removing either the free sulfuric acid or the after-formed aromatic sulfonic acid from the final product and permits the carrying out of the esterification reaction to substantially complete conversion of the organic acid being esterified.

The clay treatment is carried out under ordinary temperatures simply by contacting the finely-divided clay particles with the impure ester under ordinary conditions of temperature and pressure. Such treatment effects, quite surprisingly, a very good removal of not only the mineral acid such as the sulfuric acid, but also the organic derivatives of the sulfuric acid such as the aromatic sulfonic acids. There results a percolate which is free of undesirable acidic material. Because of the rather high polar nature of the aromatic hydrocarbon, any ester which is held by the column may be flushed out by washing the clay with additional aromatic hydrocarbon. This washing may be effected without displacing from the clay the acidic materials which have been adsorbed upon it.

The effluent or filtrate from the percolation tower or from the contact filter is neutral ester product and where an Oxo alcohol has been used which contains more than traces of sulfur impurity it is also found that the sulfur content of the filtrate or percolate is quite low. The clay treated material is preferably distilled to remove the aromatic hydrocarbon entrainer as well as any excess alcohol which is used in the reaction system, thereby producing either a finished ester as a result of merely topping or producing a distilled ester product as a result of a final vacuum distillation. Organic esters produced in this manner and particularly Oxo alcohol esters are odorless, very light in color even without distillation, and on a subsequent distillation yield a water-white product which is odorless and color stable.

Among the advantages to be obtained by the use of this treating method are included the simple recovery of the ester in a relatively pure state either without distillation or with a single distillation of the treated product to obtain a high grade, colorless and odorless ester. Furthermore, this process has the advantage of avoiding the washing of the crude ester either with water or alkali to remove the acid. Washing operations invariably result in a loss of product by emulsification and/or hydrolysis.

*Example I*

370 grams of phthalic anhydride was mixed with 806 grams of commercial grade isooctyl alcohol made by the Oxo process, said alcohol containing as impurities 82 parts of sulfur per million parts of alcohol, 1.0 gram of p-toluene sulfonic acid monohydrate used as esterification catalyst, and 200 ml. of toluene used as entrainer. The whole mixture was heated under reflux conditions, the water being removed as formed. About 52.5 ml. of water was collected and discarded. The reaction mixture was then percolated thru 160 grams of a 30/60 mesh Attapulgus clay which had been activated at 450° F. and the resulting ester percolate distilled. Toluene and the excess alcohol were recovered. The bottoms consisting substantially of crude ester was light in color, had a mild pleasant characteristic odor, and was neutral. A portion was distilled under reduced pressure yielding a water-white product. The product distilled sharply at 231° C. at 3 mm. pressure absolute. No unreacted phthalic acid or half-ester was obtained nor was any residue obtained in the distillation under reduced pressure. The finished ester contained less than 5 parts per million of sulfur on analysis.

*Example II*

2-ethyl hexanol was esterified with phthalic anhydride using the same amounts of anhydride, alcohol, catalyst and entrainer as in Example I. After percolation thru clay and vacuum stripping to remove toluene and excess alcohol, a water-white ester product was obtained showing a free acidity of 0.001 centiequivalents per gram.

What is claimed is:

1. A process for the treatment of an organic ester formed by esterifying a carboxylic acid with an alcohol in the presence of an acidic esterification catalyst with removal of water during the esterification, which comprises contacting the ester containing the acid catalyst but substantially freed of water with a finely divided heat-activated clay having a particle size of about 20 to 325 mesh, and separating the activated clay with the acid catalyst from the ester.

2. A process for the treatment of an organic ester boiling above 150° C. formed by reacting an alcohol with a carboxylic acid in the presence of an acid catalyst which remains with the ester while water is removed therefrom during esterification, which comprises contacting the ester containing the acid catalyst but substantially freed of water with a finely divided heat-activated adsorptive clay, said clay having its water content reduced to form about 6 to 10%, and separating the clay with the acid catalyst removed thereby from the ester.

3. A process for the treatment of esters boiling above 150° C. formed by esterification of a carboxylic acid with an alcohol in the presence of an acid catalyst which remains in the ester product while water is removed from the ester during the esterification, which comprises contacting the ester containing the acid catalyst with a finely divided adsorptive clay having particle size of about 20 to 325 mesh which has been activated by heating at 350°–550° F. for ½ to 4 hours to give the clay a low water content, removing the acid catalyst with said clay from the ester, and then subjecting the ester to a distillation to remove volatile organic impurities therefrom.

4. A process for the treatment of impure organic ester of a $C_8$ Oxo alcohol, said ester having been produced in the presence of sulfuric acid as the acidic esterification catalyst, with removal of water during the esterification, which comprises contacting the total ester product including the catalyst but freed of water with a mass of 30 to 60 mesh Attapulgus clay heat-activated to a low water content, removing the clay with the sulfuric acid adsorbed thereby from the ester product, maintaining said ester product shbstantially free of water while contacting with the clay, and subsequently isolating the ester by vacuum distillation, the ester being substantially free of acidic impurities during the distillation.

5. A process for treatment of the ester formed by reacting phthalic anhydride with isooctyl alcohol in the presence of an acid esterification catalyst with a low boiling aromatic hydrocarbon acting as an entrainer to remove water as it is formed, which comprises contacting the ester with finely divided clay heat-activated to a low water content, removing the clay with the acid catalyst from the ester, then stripping the ester of aromatic hydrocarbon and excess alcohol, the ester being maintained free of water during contacting with the clay and removal of the clay with the acid catalyst.

CHARLES A. COHEN.
FRED KNOTH, Jr.

References Cited in the file of this patent

UNITED STATES PATENTS

| Number | Name | Date |
|---|---|---|
| 1,739,796 | Mahler | Dec. 17, 1929 |
| 2,130,014 | Jaeger | Sept. 13, 1938 |
| 2,314,621 | Kelley | Mar. 23, 1943 |
| 2,322,316 | Rummelsburg | June 22, 1943 |
| 2,494,133 | Jefts | Jan. 10, 1950 |
| 2,542,521 | Hibshman et al. | Feb. 20, 1951 |